(No Model.)  3 Sheets—Sheet 1.

J. H. W. STRINGFELLOW.
APPARATUS FOR THE MANUFACTURE OF GAS.

No. 457,484.  Patented Aug. 11, 1891.

Witnesses:
L. N. Legendre
George Barry.

Inventor
John Henry William Stringfellow
by Attorneys
Brown & Seward (No Model.) 3 Sheets—Sheet 2.

J. H. W. STRINGFELLOW.
APPARATUS FOR THE MANUFACTURE OF GAS.

No. 457,484. Patented Aug. 11, 1891.

Witnesses:
L. N. Legendre
George Barry.

Inventor
John Henry William Stringfellow
by Attorneys
Brown & Seward

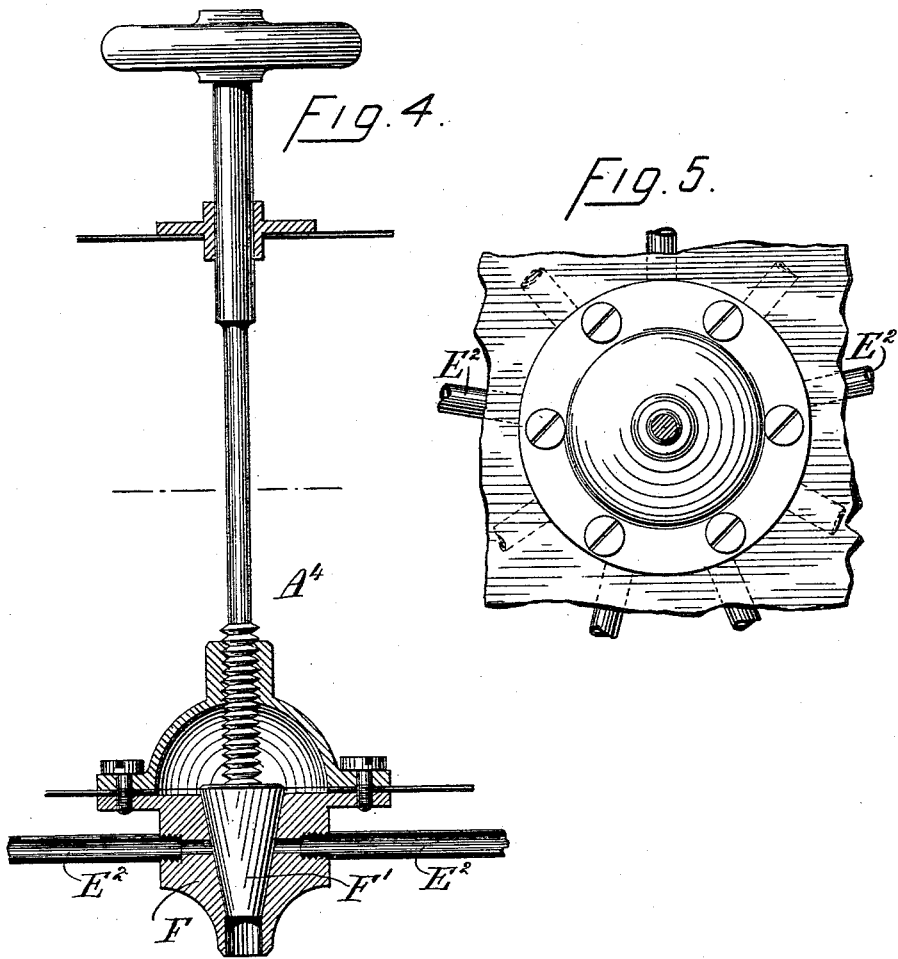

UNITED STATES PATENT OFFICE.

JOHN HENRY WILLIAMS STRINGFELLOW, OF LONDON, ENGLAND.

APPARATUS FOR THE MANUFACTURE OF GAS.

SPECIFICATION forming part of Letters Patent No. 457,484, dated August 11, 1891.

Application filed January 21, 1891. Serial No. 378,620. (No model.) Patented in England April 29, 1890, No. 6,575; in France February 6, 1891, No. 211,218, and in Belgium March 14, 1891, No. 94,138.

*To all whom it may concern:*

Be it known that I, JOHN HENRY WILLIAMS STRINGFELLOW, of 29 to 33 Wormwood Street, in the city of London, England, have invented certain new and useful Improvements in Apparatus for the Manufacture of Gas for Heating Purposes, (for which I have obtained patents in England, No. 6,575, dated April 29, 1890; in Belgium, No. 94,138, dated March 14, 1891, and in France, No. 211,218, dated February 6, 1891,) of which the following is a specification.

The object of this invention is to make gas in a simple and economical manner suitable for various purposes in the arts.

Figure 1:
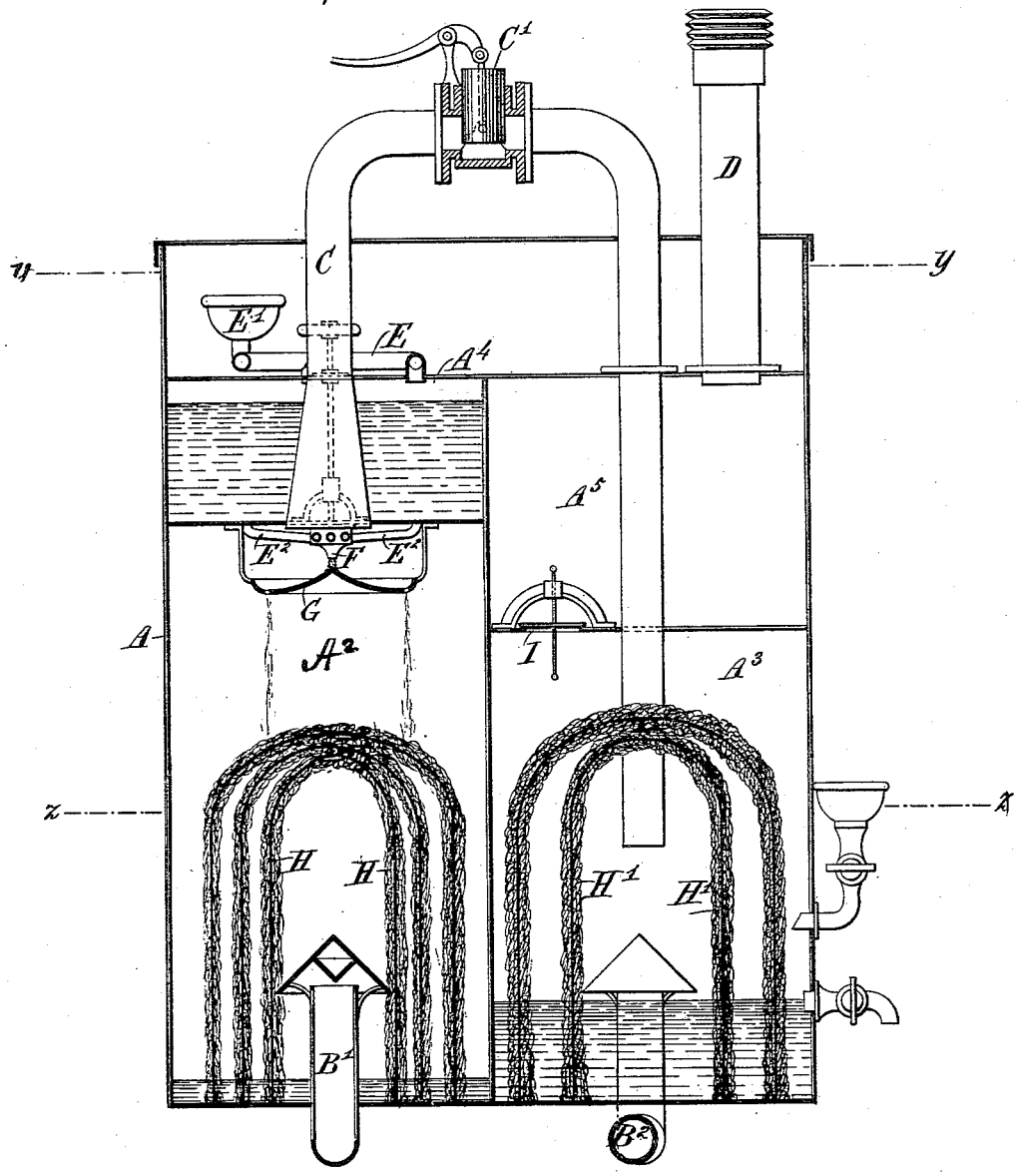
Figure 2:
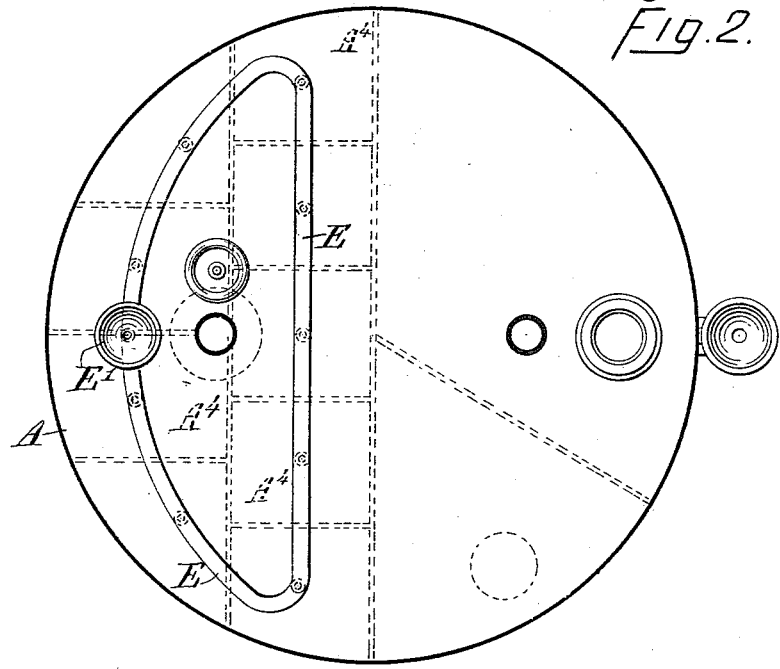
Figure 3:
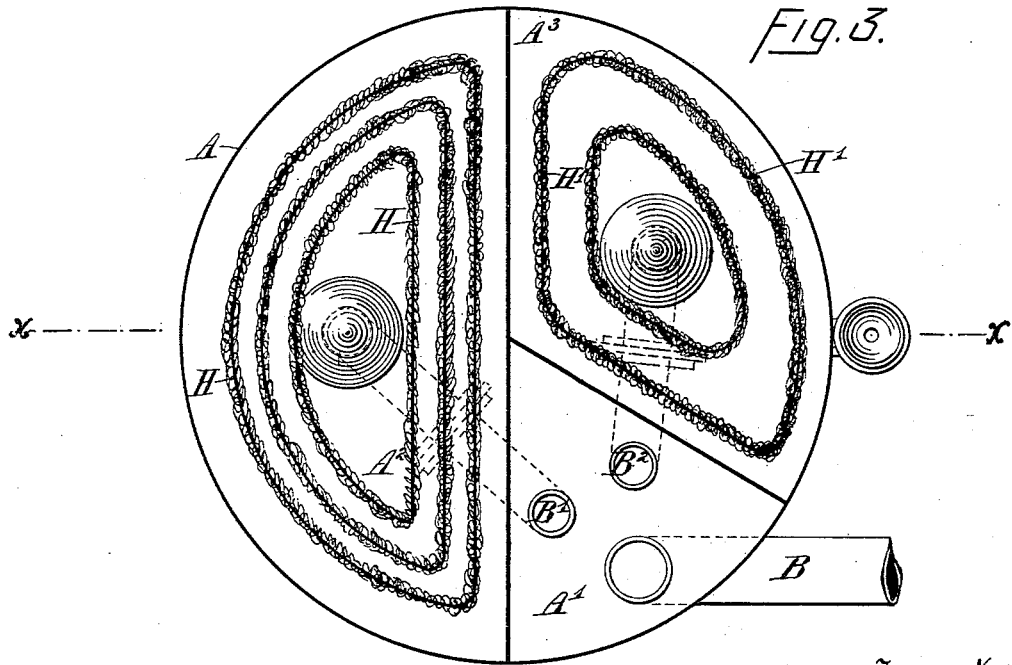

In the accompanying drawings, Figure 1 shows a vertical section of the apparatus which I employ for the purposes of my invention, taken on the line $x\,x$ of Fig. 3. Fig. 2 is a horizontal section on the line $y\,y$ of Fig. 1. Fig. 3 is a similar section on the line $z\,z$ of Fig. 1. Fig. 4 is a vertical section, and Fig. 5 a plan view, partly in section, of a valve for controlling the supply of liquid hydrocarbon; and Fig. 6 is a diagram in elevation, showing an arrangement of plant for producing gas.

The process for making gas consists in causing atmospheric air at the normal temperature to come into intimate contact with liquid hydrocarbon, whereby the air becomes more or less charged with hydrocarbon vapor, and also to cause hydrocarbon-charged gaseous fluid to come into intimate contact with water at the normal temperature, whereby it becomes charged with vapor of water, and a gas is thereby produced which is sufficiently permanent for practical purposes, has great heating-power, and is capable of being used for many purposes in the arts.

The process herein set forth forms the subject-matter of a divisional application filed by me in the United States Patent Office on June 10, 1891, Serial No. 395,763, the present application being limited to the apparatus.

In carrying out my invention I employ the apparatus shown in the accompanying drawings, which consists of a vessel A of suitable shape, divided up internally into three chambers, (see Fig. 3,)—namely, an air-receiving chamber $A'$, a hydrocarbon-chamber $A^2$, and a water-chamber $A^3$. The chamber $A^2$ contains a liquid-hydrocarbon reservoir $A^4$, which may be formed by dividing off the upper portion by means of a horizontal partition, and the chamber $A^3$ is also subdivided by a partition to form the gas-chamber $A^5$. The air-chamber $A'$ is connected with a pump or blower, or with the atmosphere, by a pipe B, and also with the hydrocarbon and the water chambers $A^2$ $A^3$ by the pipes $B'$ and $B^2$, respectively, which may be provided with regulating-valves of suitable construction.

C is a pipe, which connects the chamber $A^2$ with the chamber $A^3$, a valve $C'$, of convenient construction, being provided to regulate the flow of carbureted air to the water-chamber.

D is an outlet-pipe for the gas from the gas-chamber $A^5$ to the holder or elsewhere for use.

The reservoir $A^4$ may be subdivided into several compartments, as indicated by dotted lines in Fig. 2, each compartment being supplied from above by a perforated distributing-pipe E, provided with a funnel or receiving-cup $E'$. For delivery purposes each compartment has a pipe $E^2$, which pipes converge to the receiving chamber or barrel F of a screw-down plug-valve $F'$. (See Figs. 4 and 5.) From this valve the liquid flows in regulated quantities onto the perforated distributing-dish G, from which it passes to the chamber $A^2$.

H $H'$ are sets of screens or frame-works covered with some absorbent material, forming domes, which I term "vaporizers." These sets of vaporizers H $H'$, which may consist of two, three, or more screens, are placed in the chambers $A^2$ and $A^3$, respectively, and over the respective inlet-pipe $B'$ $B^2$ of each chamber.

The hydrocarbon liquid flows from the dish G in fine streams, drops onto the outer of the set of three vaporizers H, down which (when completely saturated) it runs and collects at the bottom, and then by capillary attraction saturates the other two vaporizers. The set of two vaporizers H' in the water-chamber A is saturated from below by capillary attraction.

I may here remark that the mode of conveying the liquids to the absorbent material may be reversed, or either mode may be used in both compartments.

The pipe C for conveying the carbureted air from $A^2$ to $A^3$ will be arranged to pass through the screens H', so that the said carbureted air will be introduced below the screens and thus be forced to pass through them to take up the water-vapor.

When making gas according to this invention, I proceed as follows: Atmospheric air is caused to enter (by pressure or exhaust) by the pipe B into the chamber A', from which it passes by the pipe B' to the chamber $A^2$ beneath the vaporizers H. It is then caused to pass through the absorbent porous material, taking up a proportion of hydrocarbon vapor, and enters the pipe C, by which it is conveyed under the water-vaporizers H' in the chamber $A^3$ to be further treated. The carbureted air is then caused to pass through the water-vaporizers H', taking up a proportion of water-vapor, by which it is converted into a gas which is sufficiently permanent for practical purposes and of high heating-power.

In the place of carbureted air, as above described, to be passed through the water-vaporizers, I may utilize natural or other gas and pass it through the apparatus with or without additional carbureting in chamber $A^2$. From the chamber $A^3$ the gas passes through the valve I into the collecting-chamber $A^5$, and thence by way of the pipe D to the holder or otherwise for use. The pipe $B^2$ is provided with well-known and suitable means for controlling the supply of air therefrom.

In some cases the hydrocarbon used may prove too rich in carbon for the purpose for which the gas is intended, and the gas would require to be diluted to a greater extent than would ordinarily take place if the whole of the air were passed through the whole apparatus. I therefore allow a portion of the air to pass direct by the pipe $B^2$ to the chamber $A^3$ below the vaporizers H', where it mixes with the rich carbureted air and dilutes it, before passing through the water-vaporizers to be converted into a permanent gas.

It will be evident that suitable filling-funnels and overflow and other taps, &c., will be provided to fill up with and regulate the height of both water and hydrocarbon.

When pressure is employed to produce the gas, the plant shown in Fig. 6 will preferably be employed, N being the pump, O an equalizer of the nature of a small gas-holder to equalize the pressure, and P the gas-making apparatus.

I may here remark that I am aware air has been caused to take up, first, water-vapor in the presence of heat and afterward hydrocarbon vapor; but that is not my invention, and does not produce a gas of great heating-power, such as I produce.

The gas or gaseous product produced, as above set forth, is sufficiently permanent for practical purposes, and burns with great intensity, rendering it suitable for incandescent lighting, smelting, and for other purposes.

What I claim is—

1. The apparatus comprising chambers having porous domes located therein, means for supplying a liquid hydrocarbon to saturate the porous dome in one of the chambers, means for supplying water to saturate the porous dome in another chamber, an air-supply pipe in communication with the hydrocarbon-chamber beneath the dome therein, an air and gas conduit leading from the chamber supplied with hydrocarbon from a point outside the dome to the chamber supplied with water at a point within the dome therein, and suitable regulating devices in connection with the air, hydrocarbon, and water supply pipes, substantially as set forth.

2. The apparatus comprising chambers, one provided with means for holding the hydrocarbon in suspension and another provided with means for holding water in suspension, an air-supply pipe leading to the hydrocarbon-chamber, an air-supply leading to the water-chamber, a gas-conduit connecting the two chambers, means for supplying the hydrocarbon to one chamber and the water to another chamber, and regulating devices in connection with the several supply-pipes, substantially as set forth.

JOHN HENRY WILLIAMS STRINGFELLOW.

Witnesses:
H. K. WHITE,
H. J. C. GOLTZ.